United States Patent
Birkenstock

(10) Patent No.: US 10,204,192 B2
(45) Date of Patent: *Feb. 12, 2019

(54) SYSTEM AND METHOD FOR DRAG REDUCTION

(76) Inventor: David T Birkenstock, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/344,673

(22) Filed: Jan. 6, 2012

(65) Prior Publication Data

US 2012/0175910 A1 Jul. 12, 2012

Related U.S. Application Data

(63) Continuation of application No. 12/211,782, filed on Sep. 16, 2008, now Pat. No. 8,113,466.

(60) Provisional application No. 60/960,139, filed on Sep. 17, 2007.

(51) Int. Cl.
G06F 17/50 (2006.01)

(52) U.S. Cl.
CPC ...... *G06F 17/5018* (2013.01); *G06F 17/5095* (2013.01); *G06F 2217/16* (2013.01); *G06F 2217/46* (2013.01); *Y02T 10/82* (2013.01)

(58) Field of Classification Search
CPC ... G06F 17/5095; G06F 2217/46; Y02T 10/82
USPC ................. 244/130, 198, 199.1, 200, 200.1
See application file for complete search history.

(56) References Cited

U.S. PATENT DOCUMENTS

| | | | |
|---|---|---|---|
| 2,169,325 A | 8/1939 | Novak | |
| 2,554,187 A | 5/1951 | Griffith | |
| 2,569,983 A * | 10/1951 | Favre | 244/206 |
| 2,737,411 A * | 3/1956 | Potter | 296/180.4 |
| 2,945,645 A * | 7/1960 | Schwarzmayr | 244/219 |
| 3,406,929 A | 10/1968 | Young | |
| 3,432,125 A * | 3/1969 | Schroeder, Jr. | 244/130 |
| 4,257,641 A * | 3/1981 | Keedy | 296/180.4 |

(Continued)

FOREIGN PATENT DOCUMENTS

| | | |
|---|---|---|
| FR | 737957 | 12/1932 |
| FR | 958682 | 5/1950 |

(Continued)

OTHER PUBLICATIONS

P.N. Peraudo et al. "Computational Study of the Embedded Engine Static Pressure Thrust Propulsion System". American Institute of Aeronautics and Astronautics.

(Continued)

*Primary Examiner* — Brian M O'Hara
*Assistant Examiner* — Keith L Dixon
(74) *Attorney, Agent, or Firm* — Maier & Maier, PLLC

(57) ABSTRACT

A system and method for drag reduction allows thrust output, fuel efficiency or both to be maximized. Specifically, a rear portion of a body or motor vehicle may be modified to increase thrust output, fuel efficiency or both by creating a stagnation area, a suction inlet and a convex cusp area formed on the rear portion of the motor vehicle. Increasing the concavity or camber or sharpness of the radius of the stagnation area results in greater local pressure coefficient, which results in greater thrust output. The size and shape of the suction inlet and the convex cusp area will also have an effect on thrust output and fuel efficiency. A width and volume of an airplane fuselage may be increased.

7 Claims, 11 Drawing Sheets

(56) References Cited

U.S. PATENT DOCUMENTS

| | | | | |
|---|---|---|---|---|
| 4,718,620 A | * | 1/1988 | Braden et al. | 244/130 |
| 4,830,315 A | * | 5/1989 | Presz et al. | 244/200 |
| 5,099,685 A | | 3/1992 | McLean et al. | |
| 5,358,200 A | | 10/1994 | Onda | |
| 8,113,466 B2 | * | 2/2012 | Birkenstock | 244/130 |

FOREIGN PATENT DOCUMENTS

| | | |
|---|---|---|
| FR | 1181456 | 6/1959 |
| GB | 578763 | 7/1946 |

OTHER PUBLICATIONS http://www.avinc.com/uas/adc/broomstick/.

http://www.archive.org/download/nasa_techdoc_19780078524/19780078524.pdf.

http://digitalcommons.calpoly.edu/cgi/viewcontent.cgi?article=1731&context=theses.

1 page from Supplementary European Search Report corresponding to European Patent Application No. 05 85 7227.

Goldschmied, F.R., "Airfoil Static-Pressure Thrust: Flight-Test Verification," AIAA Paper 90-3286, Sep. 1990.

Richards, E.J. and Burge, C.H. "An Airfoil Designed to Give Laminar Flow Over the Whole Surface with Boundary-Layer Suction," A.R.C. RBM 2263, Jun. 1943.

Richards, E.J., Walker W.S. and Greening J.R., Tests of a Griffith aerofoil in the 13ft. x 9ft. wind tunnel part 1, part 2, part 3, part 4, lift drag, pitching moments . . . .

Experimental investigation of a 40 percent think half-span boundary layer control wing, Witte, Gerhard R., and Sullivan, John P.(Purdue Univ., West Lafayette, IN).

Richards, E.J., Walker, W.S. and Taylor, C.R., "Wind-Tunnel Tests on a 30% Suction Wing" A.R.C. RBM 2149, Jul. 1945.

Merchant, Ali, and Dreal, Mark (MIT, Cambridge, MA), AIAA-1998-407, Aerospace Sciences Meeting and Exhibit, 36th, Reno, NV, Jan. 12-15, 1998.

Active control of separated flows on generic configurations at high Reynolds numbers, Seifert A., and Pack, LaTunia F., (NASA, Langley Research Center, Hampton, VA) AIAA-1999.

Multiple Actuators Flow Control over a Glauert-Goldschmied type Airfoil at Low Reynolds Numbers, YOM-TOV, J. and Seifert, A., Tel Aviv University, Tel Aviv, Israel, AIAA-2005.

Kummer, J.D. Dang, T. Q., High-Lift Propulsive Airfoil with Integrated Crossflow Fan, Journal of Aircraft 2006, vol. 43; No. 4, pp. 1059-1068.

Goldschmied, F.R., "An approach to turbulent incompressible separation under adverse pressure gradients," Journal of Aircraft 1965, 0021-8669 vol. 2 No. 2 (108-115).

Parsons, J.S.; Goodson, R.E.; Goldschmied, F.R., "Shaping of axisymmetric bodies for minimum drag in incompressible flow," Journal of Hydronautics 1974, 0022-1716 (100-107).

Goldschmied, F.R. "Aerodynamic Hull Design for HASPALTA Optimization," Journal of Aircraft 1978, 0021-8669 vol. 15 No. 9 (634-638).

Goldschmied, F.R., Comment on "An Inverse Boundary-Layer Method for Compressible Laminar and Turbulent Boundary-Layers," Journal of Aircraft 1977, vol. 14 No. 5 (509-509).

Goldschmied, F.R., "Integrated Hull Design, Boundary-Layer Control, and Propulsion of Submerged Bodies," Journal of Hydronautics 1967, 0022-1716 vol. 1 No. 1 (2-11).

Goldschmied, F.R, "Flow Control of Centrifugal Jet-Flap Blowers for Air-Cushion Vehicles," Journal of Hydronautics 1980, 0022-1716 vol. 14 No. 2 (48-55).

Joshua Roepke, An Experimental Investigation of a Goldschmied Propulsor, In Partial Fulfillment of the Requirements for the Degree Master of Science in Aerospace Engineering, A Thesis presented to the Faculty of California Polytechnic State University San Luis Obispo, Aug. 2012, 205 pages.

* cited by examiner

Goldschmied Body Geometry

Concave Aft Body
(high pressure
stagnation zone)

High pressure over the rear stagnation area generates greater thrust force than the drag of the forward section. This represents an aerodynamic drive condition.

CD= - 0.55579

CD= - 0.82302

SYSTEM AND METHOD FOR DRAG REDUCTION

CROSS REFERENCE TO RELATED APPLICATIONS

This is a continuation of U.S. patent application Ser. No. 12/211,782 filed on Sep. 16, 2008 which claims priority to U.S. Provisional Application No. 60/960,139, filed on Sep. 17, 2007, the disclosures of which are incorporated by reference herein their entireties.

BACKGROUND OF THE INVENTION

1. Field of the Invention

The present invention relates generally to pressure thrust and more specifically to a system and method for drag reduction, which allows thrust output, fuel efficiency or both to be maximized.

2. Discussion of the Prior Art

The general concept of pressure thrust is known in the airfoil and aircraft design arts. The phenomenon uses energy of the air rushing past an airplane's wing, tail surfaces or fuselage, to push that wing, tail surface or fuselage forward. The energy required to force the free stream of airflow against the aircraft is less than the energy recovered from the airflow, allowing the system to generate a decrease in total energy required.

In the 1940s and 1950s the Griffith Aerofoil was developed. Researchers focused on very thick aerofoils, for use on span-loaded flying-wing transport and they proved a meaningful decrease in total power required for those designs. Fabio Goldschmied with help from Denis Bushnell at NASA uncovered and verified the pressure thrust phenomenon. The pressure thrust phenomenon is explained in Goldschmied, F. R., "Airfoil Static-Pressure Thrust: Flight-Test Verification," AIAA Paper 90-3286, September 1990, the contents of which are hereby incorporated by reference in their entirety.

Additional documentation concerning the pressure thrust phenomenon can be found in Richards, E. J. and Burge, C. H. "An Airfoil Designed to Give Laminar Flow Over the Whole Surface with Boundary-Layer Suction," A. R. C. RBM 2263, June 1943; Richards, E. J., Walker W. S. and Greening J. R., "Tests of a Griffith aerofoil in the 13 ft.times.9 ft. wind tunnel part 1, part 2, part 3, part 4, lift, drag, pitching moments and velocity distribution," ARC/R&M-2148 ARC-7464 ARC-7561 ARC-8054 ARC-8055, 1944 and Richards, E. J., Walker, W. S. and Taylor, C. R., "Wind-Tunnel Tests on a 30% Suction Wing" A. R. C. RBM 2149, July 1945, Goldschmied, Fabio R., "Airfoil static-pressure thrust—Flight-test verification," AIAA-1990-3286, AHS, and ASEE, Aircraft Design, Systems and Operations Conference, Dayton, Ohio, Sep. 17-19, 1990. 11 p., "Experimental investigation of a 40 percent thick half-span boundary layer control wing," Witte, Gerhard R., and Sullivan, John P. (Purdue Univ., West Lafayette, Ind.), Merchant, Ali, and Drela, Mark (MIT, Cambridge, Mass.), AIAA-1998-407, Aerospace Sciences Meeting and Exhibit, 36th, Reno, Nev., Jan. 12-15, 1998, "Active control of separated flows on generic configurations at high Reynolds numbers," Seifert A., and Pack, LaTunia G., (NASA, Langley Research Center, Hampton, Va.) AIAA-1999-3403, AIAA Fluid Dynamics Conference, 30th, Norfolk, Va., Jun. 28-Jul. 1, 1999, "Multiple Actuators Flow Control over a Glauert-Goldschmied type Airfoil at Low Reynolds Numbers," Yom-Tov, J. and Seifert, A., Tel Aviv University, Tel Aviv, Israel, AIAA-2005-5389, 35th AIAA Fluid Dynamics Conference and Exhibit, Toronto, Ontario, Jun. 6-9, 2005, Kummer, J. D. Dang, T. Q., "High-Lift Propulsive Airfoil with Integrated Crossflow Fan," JOURNAL OF AIRCRAFT 2006, VOL 43; NUMB 4, pages 1059-1068, Syracuse University, Syracuse, N.Y., GOLDSCHMIED, F. R. (SPERRY RAND CORP., SPERRY UTAH CO., ADVANCED SYSTEMS DEPT., SALT LAKE CITY, UTAH), "An approach to turbulent incompressible separation under adverse pressure gradients," Journal of Aircraft 1965, 0021-8669 vol. 2 no. 2 (108-115), PARSONS, J. S. (Purdue Univ., Lafayette, Ind.); GOODSON, R. E. (Purdue Univ., Lafayette, Ind.); GOLDSCHMIED, F. R., "Shaping of axisymmetric bodies for minimum drag in incompressible flow," Journal of Hydronautics 1974, 0022-1716 vol. 8 no. 3 (100-107), Goldschmied, Fabio R., "Aerodynamic Hull Design for HASPA LTA Optimization," Journal of Aircraft 1978, 0021-8669 vol. 15 no. 9 (634-638), Goldschmied, F. R., Comment on "An Inverse Boundary-Layer Method for Compressible Laminar and Turbulent Boundary-Layers," Journal of Aircraft 1977, 0021-8669 vol. 14 no. 5 (509-509), Goldschmied, F. R., "Integrated Hull Design, Boundary-Layer Control, and Propulsion of Submerged Bodies," Journal of Hydronautics 1967, 0022-1716 vol. 1 no. 1 (2-11), and Goldschmied, F. R., "Flow Control of Centrifugal Jet-Flap Blowers for Air-Cushion Vehicles," Journal of Hydronautics 1980, 0022-1716 vol. 14 no. 2 (48-55), the contents of which are hereby incorporated by reference in their entirety.

Further, U.S. Pat. No. 5,099,685 to McLean et al. discloses a "Boundary Layer Control Diffuser for a Wind Tunnel or the Like" and U.S. Pat. No. 5,358,200 to Onda discloses an "Airship," which are hereby incorporated by reference in their entirety.

Accordingly, there is a clearly felt need in the art for a system and method for drag reduction, which allows thrust output, fuel efficiency or both to be maximized for suitable applications, such as vehicle body design.

SUMMARY OF THE INVENTION

The present invention provides a system and method for drag reduction that allows thrust output, fuel efficiency or both to be maximized. Specifically, a rear portion of a motor vehicle may be modified to increase thrust output, fuel efficiency or both by creating a stagnation area, a suction inlet and a convex cusp area on the rear portion of the motor vehicle. Increasing the concavity or sharpness of the radius of the stagnation area results in greater thrust output. The size and shape of the suction inlet and the convex cusp area will also have an effect on thrust output and fuel efficiency. A width of an airplane fuselage may be increased by creating a stagnation area, suction inlet and convex cusp area on a rear of the fuselage without a penalty to fuel efficiency.

Accordingly, it is an object of the present invention to provide a system and method for drag reduction, which allows thrust output, fuel efficiency or both to be maximized for suitable applications, such as vehicle body design.

These and additional objects, advantages, features and benefits of the present invention will become apparent from the following specification.

BRIEF DESCRIPTION OF THE DRAWINGS

Advantages of embodiments of the present invention will be apparent from the following detailed description of the exemplary embodiments thereof, which description should be considered in conjunction with the accompanying drawings in which like numerals indicate like elements, in which:

FIG. 8b shows a diagram of the same sedan with suction applied through the suction inlet at a particular flow rate and suction pressure of.

DETAILED DESCRIPTION OF THE PREFERRED EMBODIMENTS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

Figure 2A:
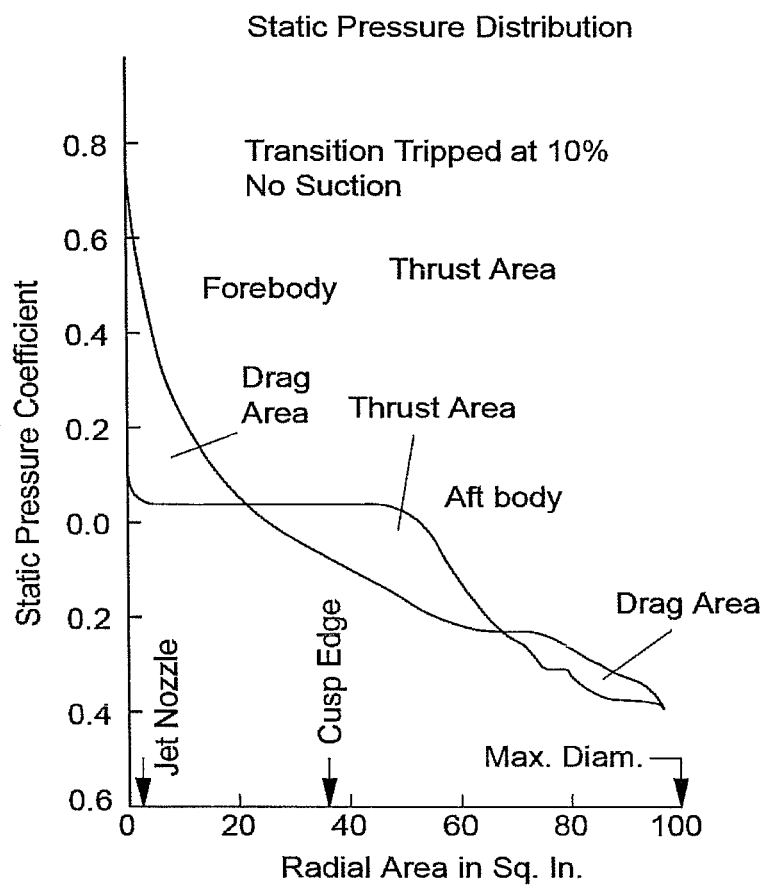
FIG. 2a is an exemplary graph representing static pressure distribution with no suction.
Figure 2B:
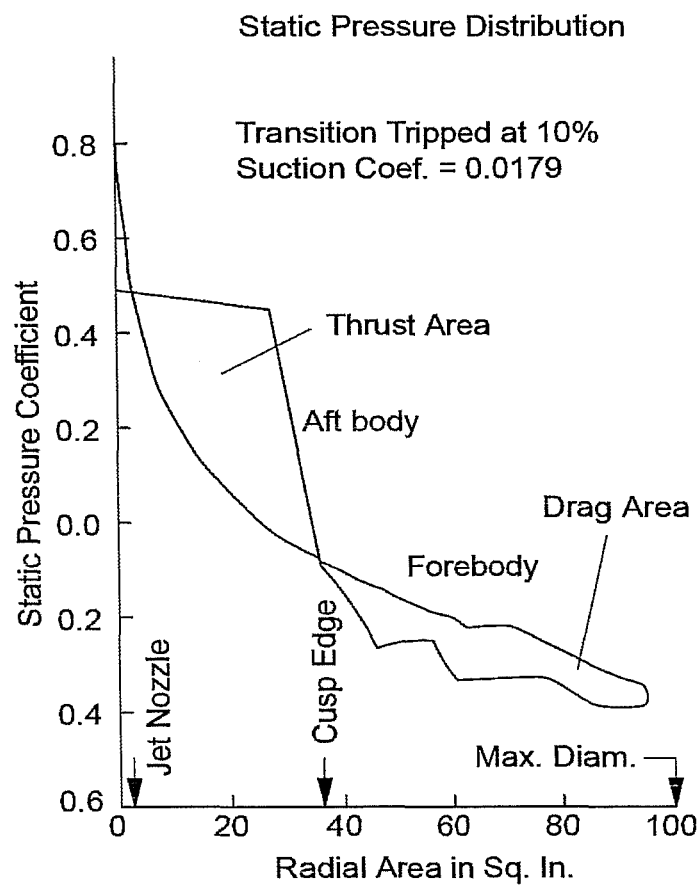
FIG. 2b is an exemplary graph representing static pressure distribution with suction.
Figure 3:
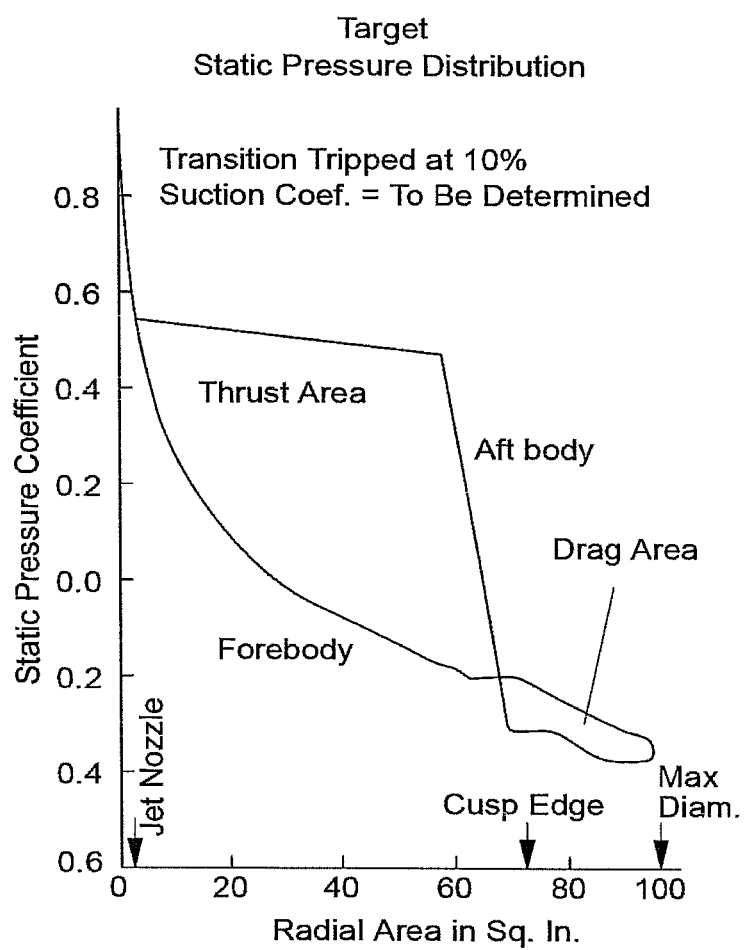
FIG. 3 is an exemplary graph representing target static pressure distribution for a modified body.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. The following description generally refers to FIGS. 1-9c. For vehicles, the current design is somewhat similar to the Brabham BT46B and Jim Halls Chaparral 2J, both of which used engine-powered suction fans to increase downforce. The current design goal is to use an engine-powered suction fan(s) to decrease aerodynamic drag and, possibly, create an aerodynamic thrust force, as illustrated in FIG. 3.

Despite encouraging results from initial testing (done in the 1940s, 1960s, etc.), improvements are required for the pressure thrust engine to reach its most favorable configuration. By varying the amount of thrust and drag that are created by different parts of the design, the power required to generate those forces and the pros and cons of regenerative braking, as well as other variables, the entire installation can be optimized for any particular vehicle.

The amount of pressure thrust generated can be determined by the local pressure coefficient and the area against which that pressure acts. The situation for aerodynamic drag generated on the rear of the vehicle is very much the same; pressure and area.

Generally referring to FIGS. 1-9c, the power that may be required to generate the target pressure distribution on the aft section(s) may depend on a number of factors: the sharpness of the inlet radius, the sharpness of the convex-curved stagnation zone and the angle from the free stream flow that the fluid flow must be bent so that it remains attached across the convex stagnation area as a few non-limiting examples. The angle from the free stream flow can be called an operating angle or a bend angle. In one embodiment, if the installation makes sizeable thrust that can be recovered by regenerative braking, the suction power that may be required to enable that thrust may be greater than the power recovered, but the recovered power will reduce the total power requirement of the power source.

The efficiency of automotive designs at high speed is measured by the simple Miles Per Gallon (MPG) yardstick. In one embodiment, a car or light truck modified to exploit pressure thrust may see a similar, if not better-than-proven, reduction in aerodynamic drag at high speed when compared to a vehicle not modified to exploit this phenomenon. The pressure thrust modification can create a significant increase in MPG performance at high speed when compared to other designs. For aircraft the situation is similar, but may be more involved. Aircraft cruise performance is described by Breguet's range equation, which is well known in the art. Breguet's equation includes a measure of traditional engine efficiency, namely thrust specific fuel consumption (TSFC). For jet engines, TSFC is defined as fuel-low per pound of thrust produced (Lbm/s/lbf or kg/s/N). The variable "V" is the flight velocity and the "g" term is the acceleration of gravity. The variable "L" is lift and the variable "D" is drag in standard aerodynamic parameters.

Breguet's classic formula illustrates the economy of power generated by the exploitation of pressure thrust. In one embodiment, combining the friction drag amount and either the reduced drag figure or the independent thrust (as negative drag) with its required fuel consumption in the range factor section of Breguet's range equation can allow the classic aircraft performance equation to correctly measure the pressure thrust phenomenon's impact on the range factor of any given aircraft. The range factor of the range equation:

$$V(L/D)/g(TSFC)$$

One important note for jetliners, however, is that transonic shock waves on the concave pressure recovery area might complicate the design. In spite of this, these shockwaves have been shown to reduce drag on an airfoil designed by John Roncz and can be similarly exploited on a fuselage. Optimizing the ratio of inlet surface area (which creates drag) to stagnation zone surface area (thrust) can allow the modified geometry to create much less pressure drag and increased pressure thrust than does the standard Griffith/Goldschmied design known to one having ordinary skill in the art. The inlet surface area to stagnation zone surface area ratio can be tailored to any specific problem by iterative design, which is a standard practice in this art.

Varying the degree of concavity may also allow the designer to tailor a Static Pressure Coefficient, and therefore, the thrust generated, so it will match any specific goal. Provided the fluid flow is attached, which is a function of suction power at any given airspeed, the concavity determines the Static Pressure Coefficient generated.

Figure 1:
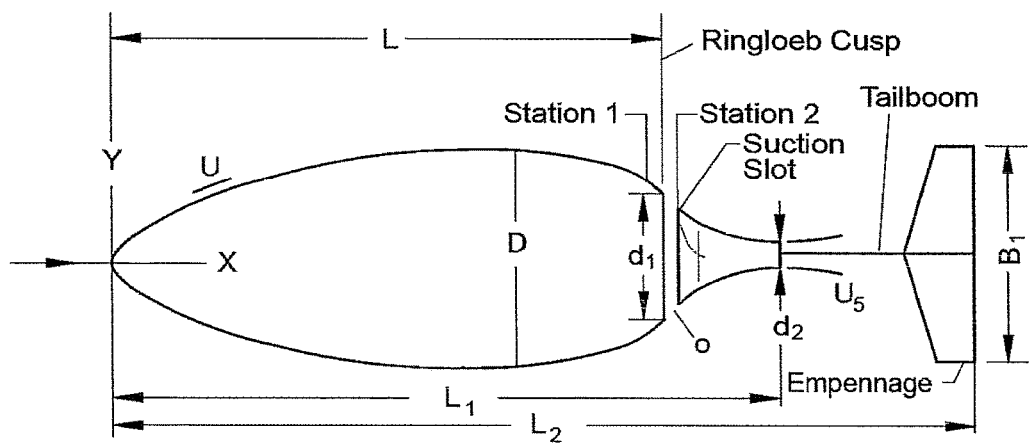
FIG. 1 is an exemplary diagram representing a body of revolution.

In one exemplary embodiment, a way to measure different designs is to note the ratio of stagnation area per unit of inlet area. Referring to FIG. 1, for the un-modified Goldschmied design, the ratio may be close to 1/2. For an optimized design, the ratio could be far higher than 1/1. To prohibit unwanted transonic shockwaves on a jetliner fuselage, the optimal design may have a lower ratio than an optimized automobile design. FIGS. 2a and 2b represent pressure distributions on the body of a revolution depicted in FIG. 1. FIG. 2a shows a diagram for the unmodified Goldschmeid body with no suction and FIG. 2b shows it with suction.

Quoting, Goldschmied, F. R.—Fuselage self-propulsion by static-pressure thrust Wind Tunnel Verification, AIAA 87-2935: "When the static pressure coefficient is plotted vertically against the square of the body radius on the horizontal scale, the nose and tail are at the left margin and the location of maximum diameter is at the right margin. Knowing the slopes of the body, one can deduce which loops represent drag and which represent thrust. Summed with integration if the surface pressures should give the same net drag as determined by momentum loss integration in the wake." Goldschmied's attempts to show this were frustrated.—Goldschmied, F. R.—Fuselage self-propulsion by static-pressure thrust Wind Tunnel Verification. AIAA 87-2935, which is hereby incorporated by reference in its entirety.

FIG. 3 shows a diagram with the target pressure distribution for a modified body with the thrust area (shown on the horizontal axis, bottom) increased from roughly 38% (as measured by distance from Jet Nozzle to Cusp Edge, in FIGS. 1-3 above) to over 75% of total Radial Area. The benefits of decreased drag area and increased thrust area may not depend on an increase in Static Pressure Coefficient.

Figure 4A:
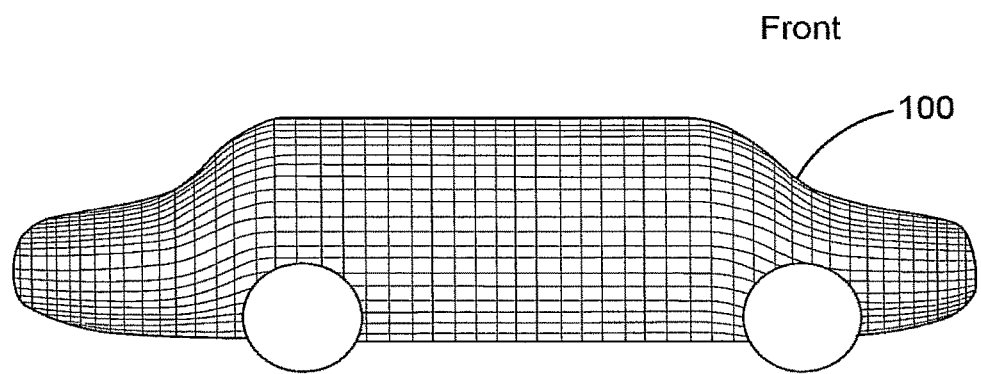
FIG. 4a is an exemplary diagram representing a standard sedan profile.
Figure 4B:
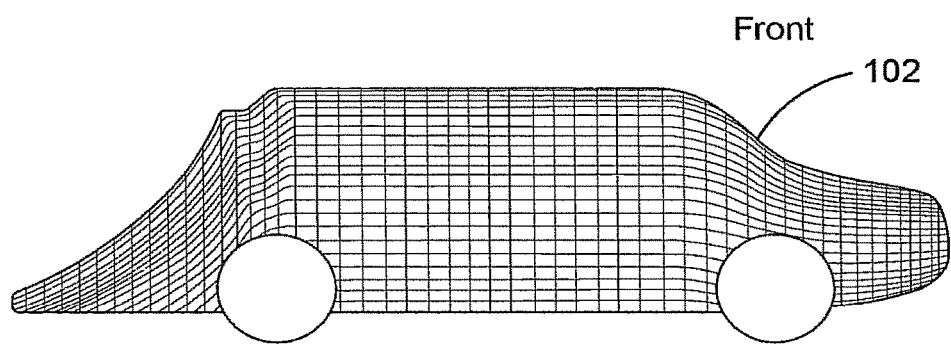
FIG. 4b is an exemplary diagram representing a modified sedan profile.

Referring now to FIGS. 4a and 4b, the degree of concavity of the concave stagnation area can determine the amount of thrust generated provided enough suction is used to keep flow attached. FIG. 4a discloses a first vehicle body profile 100. FIG. 4b discloses a second vehicle body profile 102.

Figure 5A:
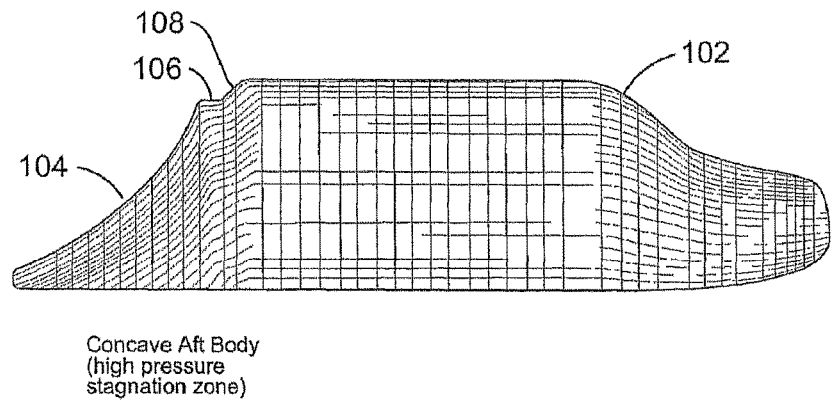
FIG. 5a is an exemplary diagram representing labeled parts of a sedan profile.
Figure 5B:
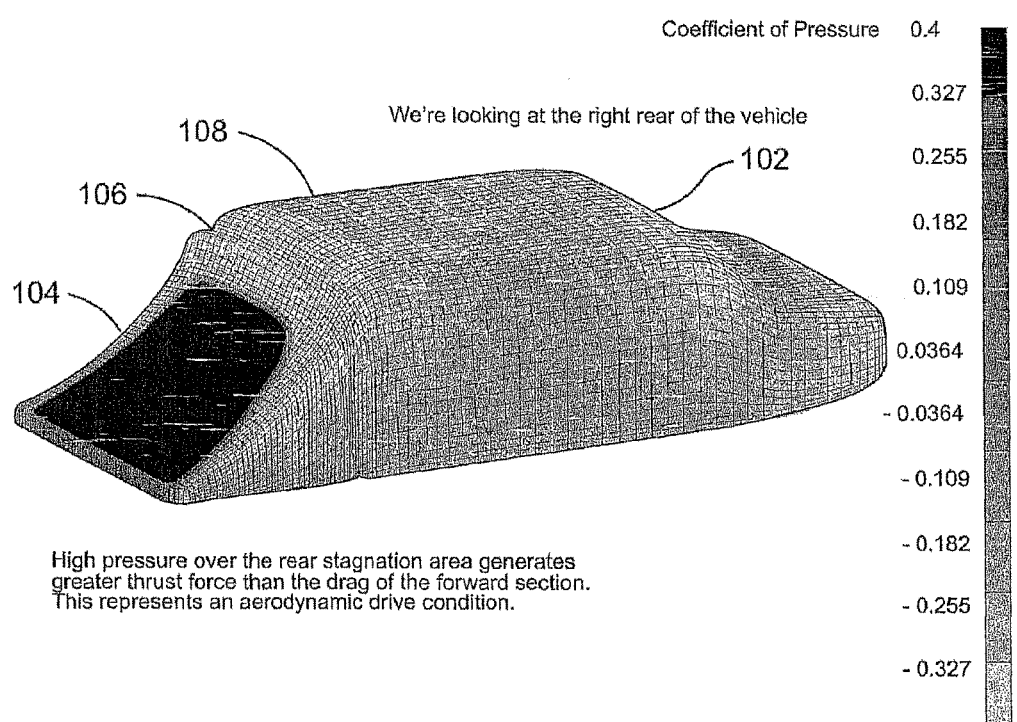
FIG. 5b is an exemplary diagram representing labeled profiles and parts with computed pressure coefficients shown.

Referring generally to FIGS. 5a and 5b, in one exemplary embodiment, the degree of concavity or sharpness of the radius of the stagnation area 104 of the second vehicle body profile 102 determines the amount of thrust generated, provided enough suction is used to keep flow attached. The need for suction power, which varies with concavity of the stagnation zone 104, may have an impact on the overall fuel efficiency of the object. An increase in the stagnation area 104 will tend to create increase thrust force, with or without an increase in pressure coefficient (Cp), because force acts on the greater stagnation area 104. Skin friction will tend to decrease Cp on the concave curve of the stagnation area 104. An increase in the camber of an airfoil will tend to increase the lift coefficient (Cl) produced; an increase in camber, bend angle or sharpness of the stagnation area 104 will tend to increase Cp and therefore increase thrust force. An inlet area 106 is formed upstream from the stagnation area 104. Optimizing dimensions of the inlet area 106 are well known in the art.

A cusp area 108 is located upstream from the inlet area 106. A shape of the cusp area 108 will impact performance of the inlet area 106 and the stagnation area 104. The cusp area 108 begins when a body cross-section reaches its greatest value and starts to decrease. Decreasing camber, sharpness, bend angle of the stagnation area 104 will tend to decrease thrust force because the stagnation area Cp is reduced. At the same time, increased camber, "bend angle" etc., will increase stagnation area Cp, which will increase thrust force.

Varying the parameters of the stagnation area 104, the inlet area 106 and the cusp area 108 will change the efficiency of a mechanism optimized to exploit this phenomenon for a specific purpose, such as maximum thrust or maximum fuel efficiency. The force changes and interactions, brought about by changing these design details as discussed, are predictable and can be modeled so that industry standard methods like iterative and inverse design can be used to optimize the object or mechanism. In the hands of a person skilled in the art of aerodynamic optimization, tools like iterative design and inverse design will make short work of this type of optimization for any purpose.

Increasing the sharpness of the convex surface of the cusp area 108 will change the direction of the local airflow as the airflow reaches the aft end of the convex cusp area 108 (a convex inlet of relatively low camber or sharpness will bend local airflow to a lesser degree than a convex inlet of relatively high camber or sharpness). If the concave-curved stagnation area 104 is not designed to require or make use of local airflow that has been bent to this angle, the system efficiency will be reduced because the local airflow is bent too far. Less-than-optimal efficiency will result from local airflow that is either not bent far enough, or bent too far than the optimal amount for a specific concave stagnation zone design.

Increasing the sharpness of the convex surface of the cusp area 108 will also allow for increased area and sharpness, bend angle or camber of the concave stagnation area 104, which will increase the local pressure coefficient (Cp) across the stagnation area 104. The higher pressure on the concave curve of the stagnation area 104 will increase thrust output compared to thrust created by a relatively lower pressure on the concave curve of the stagnation area 104.

Increasing the sharpness of the convex surface of the cusp area 108 will tend to increase the suction power required to keep the airflow attached across the concave stagnation area 104 as well as increase thrust output. An increase in the sharpness of the convex surface of the cusp area 108 will tend to decrease fuel efficiency as well as decrease drag as one would expect (more thrust requires more power).

Increasing the cusp area 108 will tend to decrease the area available for the stagnation area 104, which will tend to decrease maximum possible thrust output. Thrust output, drag, and efficiency are functions of the nature of turbulent flow drag (a function of the size and camber of the stagnation area 104, where higher stagnation area camber creates higher turbulent flow drag), suction power required (a function of inlet area 106 size and camber), the local pressure coefficient generated across the concave stagnation area 104 (a function of stagnation zone camber and suction power) and the size of that concave stagnation area 104 (a function of suction system outflow size, convex inlet area size & vice versa) as well as traditional aerodynamic subjects like separated airflow drag, etc.

An increase in the area of the cusp area 108 will create more pressure drag (from relatively low pressure across the cusp area), but this tends to be a much smaller force than the skin friction turbulent flow) drag generated on the concave stagnation area 104.

Figure 9A:
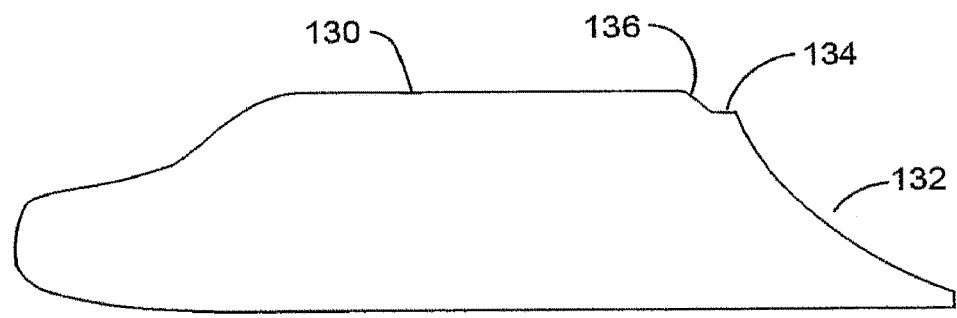
FIG. 9a is a first embodiment of a lengthwise vehicle profile tested by the Virginia Polytechnic Institute and State University.
Figure 9B:
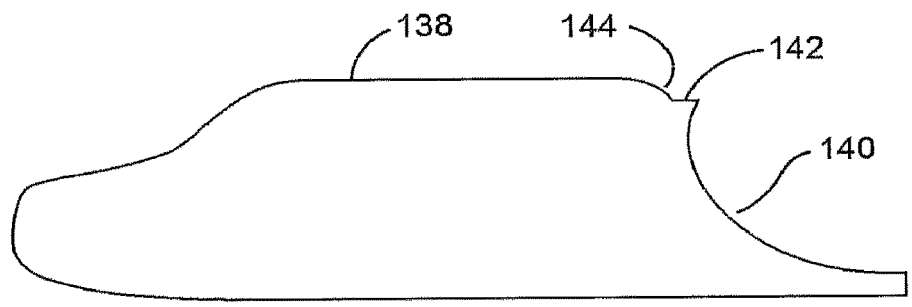
FIG. 9b is a second embodiment of a lengthwise vehicle profile tested by the Virginia Polytechnic Institute and State University.
Figure 9C:
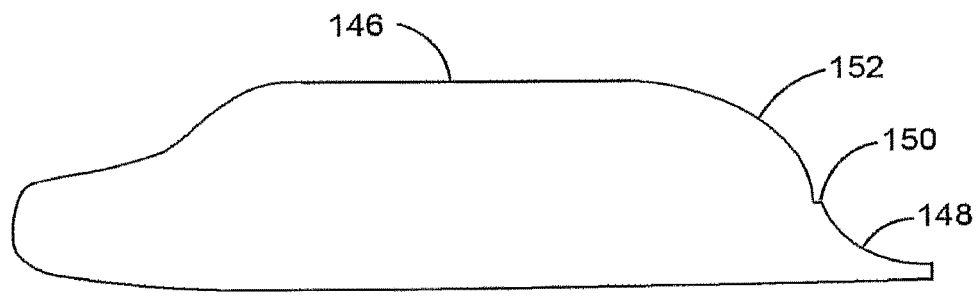
FIG. 9c is a third embodiment of a lengthwise vehicle profile tested by the Virginia Polytechnic Institute and State University.
Figure 9D:
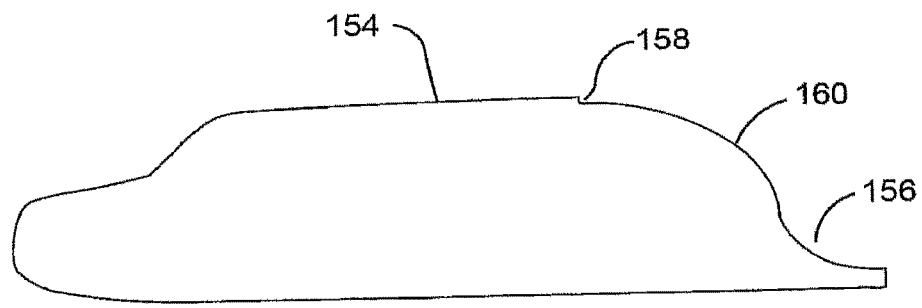
FIG. 9d is a fourth embodiment of a lengthwise vehicle profile with a blowing slot to exploit the Coanda effect.

A similar approach includes exploitation of the phenomenon called the Coanda effect, which is shown in FIG. 9d to maintain attached fluid flow across the concave shape of the stagnation area.

Figure 6A:
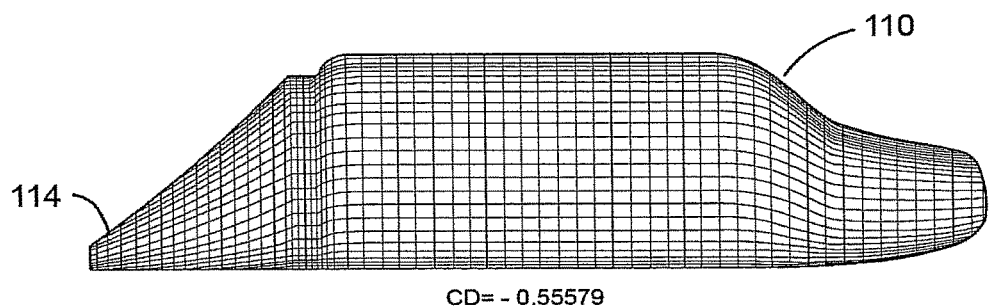
FIG. 6a is an exemplary graph representing a labeled profile and parts with a computed drag coefficient shown.
Figure 6B:
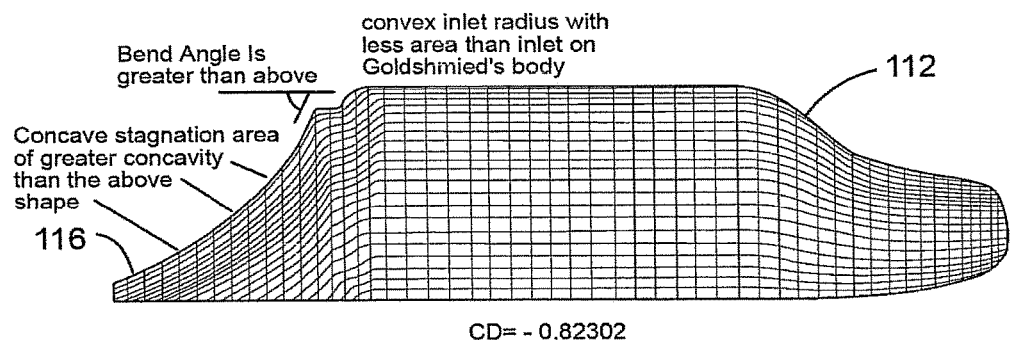
FIG. 6b is another is an exemplary graph representing a labeled profile and parts with a computed drag coefficient shown.

With reference to FIG. 6a, a third vehicle body profile 110 is shown. With reference to FIG. 6b, a fourth vehicle body profile 112 is shown. The concavity of the stagnation area 114 of the third vehicle body profile 110 differs from the concavity of the stagnation area 116. By changing the concavity of the stagnation area, the local pressure coefficient (Cp) may also be changed and, as a result, the pressure force may be changed, as shown by the difference in calculated Coefficient of Drag (Cd). The fourth vehicle body profile 112 has a Cd of −0.82302 and third vehicle body profile 110 has a Cd of −0.55579. The greater concavity of the stagnation area 116 generates a greater thrust force than that of the third vehicle body profile 110.

The Coefficient of Drag (Cd) is not actually negative, the Computational Fluid Dynamics software that computed the drag coefficients still includes the effects of pressure in the Cd calculation. An analysis will show that the total Coefficient of Drag has been slashed dramatically but that the drag forces are positive and still very real.

Figure 7:
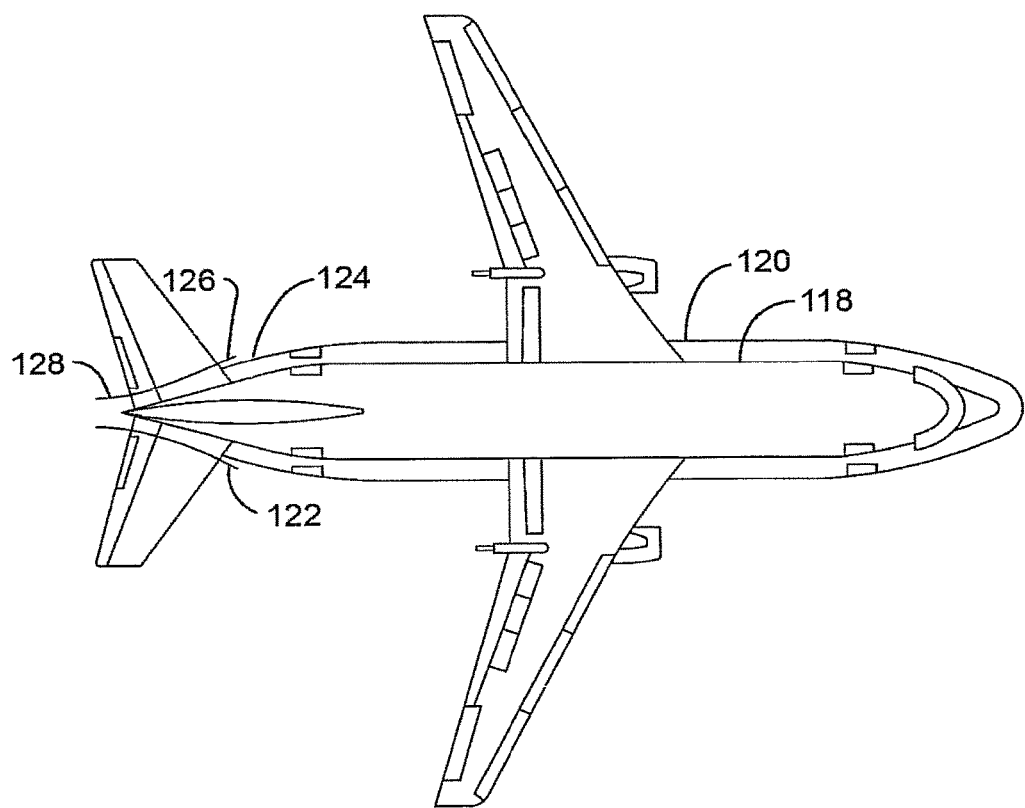
FIG. 7 is an exemplary embodiment of a fuselage superimposed on top of an exemplary airliner.

In yet another exemplary embodiment as shown in FIG. 7, the system and method for drag reduction can allow a jetliner to be much wider without suffering the traditional fuel burn penalty associated with greater fuselage area. A top view of a Boeing 737 airliner 118 is shown. A wider fuselage 120 is superimposed on top of the normal Boeing 737 airliner 118. The wider fuselage 120 reveals an exemplary pressure thrust installation at a rear 122. The rear 122 modification includes forming a cusp 124, an inlet area 126 and a stagnation area 128. An increase in camber, concavity, bend angle or sharpness of the stagnation area 128 will tend to increase Cp and therefore increase thrust force. The inlet area 126 is formed upstream from the stagnation area 128. The cusp 124 is located upstream from the inlet area 126. Optimizing dimensions of the inlet area 126 are well known in the art. The rear 122 of the wider fuselage 120 will cause that aircraft to hold more passengers than the normal Boeing 737 airliner 118 without the penalty of increased fuel burn.

One exemplary embodiment of the invention can be summarized as follows, a high (above ambient) pressure coefficient varies with changes to slope on concave pressure recovery area, a concave part may act much like an airfoil. The goal of wing airfoil is low pressure lift and the goal of a pressure thrust airfoil is high pressure thrust.

Figure 8A:
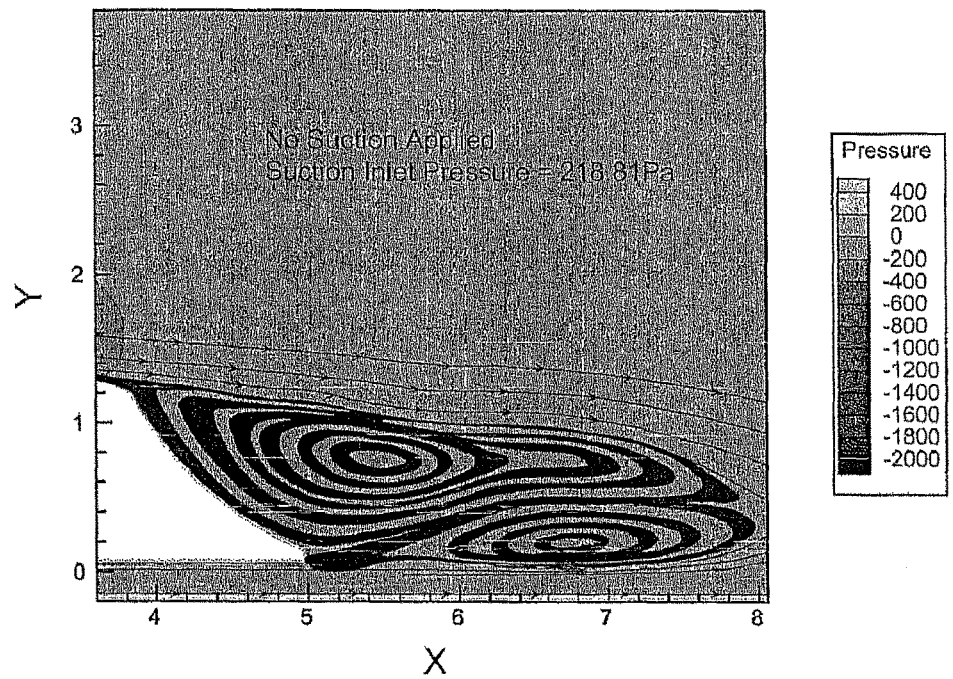
FIG. 8a is a diagram of a separated airflow behind a generic sedan shape, the drag coefficient for this shape was computed to be 0.34.
Figure 8B:
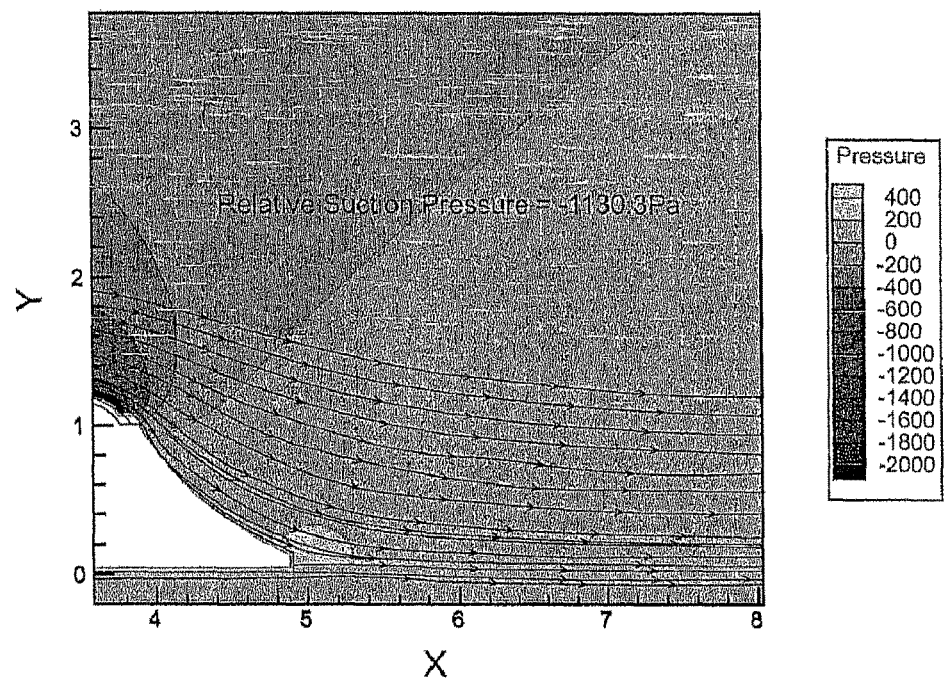

Total thrust vs. drag performance can vary with changes to:
  Drag force:
    Convex Inlet area
    Convex Inlet radius/slope/camber
    Low pressure coefficient acting on this convex inlet radius/slope/camber & area
    Skin friction acting on radius/slope/camber & area of convex and concave curved areas
  Thrust force:
    Concave pressure recovery area
    Concave pressure recovery radius/slope/camber
    High pressure coefficient acting on this radius/slope/camber & area Total efficiency can vary with changes to:
  Suction power
  Convex inlet radius/slope/camber
  Inlet area
  Concave stagnation zone radius/slope/camber
  Concave stagnation area
  Regenerative braking
  Suction fan efficiency FIGS. 8a & 8b are diagrams from computational fluid dynamics tests run at the Virginia Polytechnic Institute and State University. FIG. 8a shows separated airflow behind the generic sedan shape 130 shown in FIG. 9a. The drag coefficient for generic sedan shape 130, without suction power is computed to be 0.34. FIG. 8b shows the same sedan with suction applied through a suction inlet 134 at a suction pressure of −1130.3 Pa. The computed drag coefficient for the suction-on configuration was 0.1425.

To increase thrust output from the pressure thrust installation and minimize turbulent flow drag, the designers would need to decrease the surface area of stagnation area 132 and increase the sharpness of the bend of the stagnation area 132. Increasing the sharpness of the stagnation area 132 would increase the local pressure coefficient, similar to increasing the camber of an airfoil to increase the lift coefficient of the airfoil. Increasing the sharpness of the stagnation area 132 would further decrease the computed drag coefficient to a potentially negative number, which would indicate a genuine thrust condition.

Varying the camber of an airfoil to directly change the lift characteristics of that airfoil is a well know mechanism, which is widely used by aerodynamicists optimizing airfoils for a particular use or purpose. The flap systems of almost every aircraft flying are designed to change the camber of the airfoil so that the combination of airfoil and extended flap create an airfoil with greater camber, so that the modified airfoil will be able to create a greater lift coefficient and therefore greater lift. High-lift devices are well known in the art and are widely used throughout the art.

Because the high-lift devices are well known, many skilled in the art of airfoil design will be readily able to bring that knowledge and skill to the task of optimizing the pressure thrust installation.

With reference to FIG. 9a, the sedan shape 130 is shown as tested by Virginia Polytechnic Institute. The sedan shape 130 includes the concave stagnation area 132, the suction inlet 134 and a convex cusp area 136. With reference to FIG. 9b, a sedan shape 138 includes most of the same basic features of the sedan shape 130. However, a stagnation area 140 includes an exaggerated camber, sharpness or "bend angle" relative to the stagnation area 132. The geometry of the stagnation area 140 may require more suction power to keep the local airflow attached, but it will also generate more thrust, just like a wing with greater camber can generate more aerodynamic lift. A suction inlet 142 and a convex cusp area 144 of sedan shape 138 are similar to the suction inlet 134 and convex cusp area 136 of the sedan shape 130.

With reference to FIG. 9c, a sedan shape 146 includes a stagnation area 148, a suction inlet 150 and a convex cusp area 152. The stagnation area 148 is lower than that shown in FIGS. 9a and 9b and smaller than the convex cusp area 152. The suction inlet 150 is still needed. The suction inlet 150 is sized and shaped as needed using mechanisms well known to those skilled in the art.

Making the convex cusp area 152 greater than the stagnation area 148 will not make huge differences alone. The way to create high thrust output is to use a relatively sharp bend (increased camber) on the concave curve of the stagnation zone 148, and for that curve to occupy a relatively large area. Similarly, maximum efficiency will likely require a relatively shallow bend (decreased camber) on the concave curve of the stagnation area 148 and for the concave curve to occupy a relatively small area.

With reference to FIG. 9d, a sedan shape 154 includes a stagnation area 156, a blowing outlet 158 and a convex cusp area 160. The blowing outlet 158 is needed to enable the coanda effect to bend the local airflow enough to keep it attached across the stagnation area 156. The blowing outlet 158 is sized and shaped as needed using mechanisms well known to those skilled in the art.

Concerning FIGS. 4-9d, to optimize performance of an object for a particular purpose, the designer will need to vary suction power used, the sharpness/camber and area of the inlet cusp and of the stagnation zone to achieve the particular design goal. To decrease the power required by the suction pump, one would increase the size of the inlet cusp and decrease the size of the stagnation zone (this will decrease thrust generated). To decrease the power required by the suction pump, one would increase the size of the inlet cusp and decrease the size of the stagnation zone (this will decrease thrust generated). To increase the thrust created, one would increase the sharpness or bend or camber of the stagnation zone and/or increase the area of the stagnation zone (This will increase the suction power required). Similarly, to decrease the turbulent flow drag, one would decrease the area of the stagnation zone. By varying these different design parameters, a designer can optimize this system for any given purpose (i.e. Maximum efficiency, or maximum forward thrust, etc.).

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for increasing efficiency of an aircraft body moving through a fluid, comprising the steps of:
    forming a convex cusp area at substantially a rear of the aircraft body;
    extending a suction inlet and extending a stagnation area from an end of said suction inlet, said stagnation area having a concave shape;
    increasing a sharpness of at least a portion of said concave shape to vary a shape of the stagnation area such that a local pressure coefficient across at least a portion of the stagnation area is adjusted to increase thrust output; and
    varying at least one dimension of the suction inlet based upon the sharpness of the at least a portion of said concave shape.

2. The method of claim 1, further comprising the step of: providing said stagnation area with a surface area that is greater than a surface area of said convex cusp area.

3. The method of claim 1, further comprising the step of: varying said convex cusp area and said stagnation area.

4. The method of claim 1, further comprising the step of: increasing a sharpness of said convex cusp area to decrease drag.

5. The method of claim 1, further comprising the step of: increasing said convex cusp area to increase pressure drag.

6. The method of claim 1, further comprising the step of: reducing the sharpness of said concave shape to decrease thrust output.

7. The method of claim 1, further comprising the step of: reducing the area of said stagnation area to reduce thrust output.

* * * * *